United States Patent
Vogel et al.

(10) Patent No.: US 7,324,911 B2
(45) Date of Patent: Jan. 29, 2008

(54) METHOD OF PLANNING, INSTALLING, AND VERIFYING A SET OF ELECTRICAL CABLES IN A BUILDING

(75) Inventors: Ronald J. Vogel, Camarillo, CA (US); Lee A. Watkins, Thousand Oaks, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 442 days.

(21) Appl. No.: 10/934,816

(22) Filed: Sep. 3, 2004

(65) Prior Publication Data
US 2005/0288946 A1    Dec. 29, 2005

Related U.S. Application Data

(60) Provisional application No. 60/584,303, filed on Jun. 29, 2004.

(51) Int. Cl.
*G01B 27/28* (2006.01)
(52) U.S. Cl. .................. 702/117; 702/123
(58) Field of Classification Search ............ 702/117, 702/123
See application file for complete search history.

(56) References Cited

U.S. PATENT DOCUMENTS

| | | | |
|---|---|---|---|
| 4,964,060 A | 10/1990 | Hartsog | |
| 5,036,479 A | 7/1991 | Prednis et al. | |
| 5,432,705 A | 7/1995 | Severt et al. | |
| 5,511,108 A | 4/1996 | Severt et al. | |
| 5,552,699 A | 9/1996 | Redmer | |
| 5,629,628 A | 5/1997 | Hinds et al. | |
| 5,664,105 A | 9/1997 | Keisling et al. | |
| 5,698,985 A | 12/1997 | Bottman | |
| 5,821,937 A | 10/1998 | Tonelli | |
| 5,831,610 A | 11/1998 | Tonelli | |
| 5,907,850 A | 5/1999 | Krause | |
| 5,946,301 A | 8/1999 | Swanson et al. | |
| 6,002,247 A | 12/1999 | Watkins | |
| 6,058,262 A | 5/2000 | Kawas | |
| 6,064,721 A | 5/2000 | Mohammadian | |
| 6,385,300 B1 | 5/2002 | Mohammadian | |
| 6,442,507 B1 | 8/2002 | Skidmore | |
| 6,466,885 B2 | 10/2002 | Miller, Jr. | |
| 6,493,679 B1 | 12/2002 | Rappaport, et al. | |
| 6,590,963 B2 | 7/2003 | Mohammadian | |
| 6,611,147 B2 | 8/2003 | White | |
| 6,625,454 B1 | 9/2003 | Rappaport et al. | |
| 6,646,454 B2 | 11/2003 | Watkins | |
| 6,731,102 B2 | 5/2004 | Gregorec | |

(Continued)

FOREIGN PATENT DOCUMENTS

CA    2278210    7/1998

(Continued)

*Primary Examiner*—John Barlow
*Assistant Examiner*—Stephen J. Cherry
(74) *Attorney, Agent, or Firm*—Allen, Dyer, Doppelt, Milbrath & Gilchrist, P.A.

(57) ABSTRACT

A business method for comprehensively planning the installation into a building of various dissimilar types of electrical cables. A feature of the method is that each individual cable, when installed in place, is then tested for the level of performance which will be required of that cable in that location.

39 Claims, 12 Drawing Sheets

U.S. PATENT DOCUMENTS

| | | |
|---|---|---|
| 6,738,454 B2 | 5/2004 | Mohammadian |
| 6,777,952 B2 | 8/2004 | Seymour |
| 6,778,934 B1 | 8/2004 | Hori et al. |
| 6,785,805 B1 | 8/2004 | House, et al. |
| 6,791,336 B2 | 9/2004 | Krigel |
| 6,812,712 B2 | 11/2004 | Linzey |
| 6,820,225 B1 | 11/2004 | Johnson |
| 6,842,760 B1 | 1/2005 | Dorgan, et al. |
| 6,847,213 B2 | 1/2005 | Renken |
| 6,851,612 B2 | 2/2005 | Iasso, et al. |
| 6,859,768 B1 | 2/2005 | Wakelam |
| 6,868,357 B2 | 3/2005 | Furse |
| 6,871,156 B2 | 3/2005 | Wallace, et al. |
| 6,876,890 B1 | 4/2005 | Oleniczak |
| 6,876,960 B1 | 4/2005 | Naylor, et al. |
| 6,944,569 B2 | 9/2005 | Harbord |
| 6,971,063 B1 | 11/2005 | Rappaport |
| 2002/0006799 A1 | 1/2002 | Rappaport et al. |
| 2003/0033187 A1 | 2/2003 | Jones et al. |
| 2003/0086537 A1 | 5/2003 | Schultz |
| 2003/0200062 A1 | 10/2003 | Dessureault |
| 2004/0038683 A1 | 2/2004 | Rappaport et al. |
| 2004/0133415 A1 | 7/2004 | Rappaport et al. |
| 2004/0143428 A1 | 7/2004 | Rappaport et al. |
| 2004/0208293 A1 | 10/2004 | Mohammadian et al. |
| 2004/0230387 A1* | 11/2004 | Bechhoefer ............ 702/58 |
| 2004/0236586 A1 | 11/2004 | Hirshkind, Jr. |
| 2004/0243326 A1 | 12/2004 | Daoud, et al. |
| 2005/0027588 A1 | 2/2005 | Current |
| 2006/0015814 A1 | 1/2006 | Rappaport |

FOREIGN PATENT DOCUMENTS

| | | |
|---|---|---|
| DE | 19701726 | 7/1998 |
| EP | 1465320 | 10/2004 |
| GB | 2370127 | 6/2002 |
| GB | 2398931 | 9/2004 |

\* cited by examiner

FLOW CHART / STEPS OF PREFERRED NEW METHOD

*THE CABLES ARE PHYSICALLY INSTALLED*

INSTALLED CABLES ARE TESTED AND CERTIFIED BY A TEST INSTRUMENT WHICH INCLUDES A REMOTE TERMINATION ACCESSORY THAT CAN BE SELECTIVELY ACTIVATED BY A SIGNAL THROUGH THE CABLE
- PLACING THE PORTABLE TEST INSTRUMENT ON ONE END OF THE CABLE AND THE REMOTE ON THE OTHER END
- SCROLLING THROUGH THE CABLE LISTINGS ON THE SCREEN OF THE PORTABLE TEST INSTRUMENT TO DISPLAY THE CABLE TO BE TESTED
- STARTING THE TEST (THE PORTABLE TEST INSTRUMENT SEQUENTIALLY TESTS ALL WIRE COMBINATIONS CONTAINED WITHIN THE CABLE AND COMMUNICATES WITH THE REMOTE TERMINATION UNIT FOR THROUGHPUT TESTS)
- PASS/FAIL STATUS IS DETERMINED, AND A SUMMARY OF THE RESULTS ARE STORED

UPON COMPLETION OF THE TEST PLAN
- THE PASS/FAIL TEST RESULTS AND A SUMMARY OF THE DATA TAKEN ARE ALL UP LOADED BACK TO THE MAIN COMPUTER FOR ARCHIVING

FIGURE 4D

LIST OF CABLES TO TEST

| | ID | To | From | Type | Use | Length | Result |
|---|---|---|---|---|---|---|---|
| 1 | Cable001 | 02Panel01 | 02Net03 | CAT5 ▼ | Network ▼ | | ? Untested |
| 2 | Cable002 | 02Panel01 | 02Net01 | CAT5 ▼ | Network ▼ | | ? Untested |
| 3 | Cable003 | 02Panel01 | 02Net02 | CAT5 ▼ | Network ▼ | | ? Untested |
| 4 | Cable004 | 02Panel01 | 02Plate02 | RJ12 ▼ | ▼ | | ? Untested |
| 5 | Cable005 | 02Panel01 | 02TV01 | RG6 ▼ | TV ▼ | | ? Untested |
| 6 | Cable006 | 02Panel01 | 02Plate01 | CAT5 ▼ | | | ? Untested |

FIGURE 7

PORTABLE TEST INSTRUMENT

METHOD OF PLANNING, INSTALLING, AND VERIFYING A SET OF ELECTRICAL CABLES IN A BUILDING

PRIORITY CLAIM

This application claims priority of U.S. Provisional Application Ser. No. 60/584,303 filed Jun. 29, 2004.

FIELD OF THE INVENTION

The field of this invention is the installation of electrical cables in buildings.

PRIOR ART

Prior art includes U.S. Pat. Nos. 5,629,628; 5,664,105; 5,698,985; 5,946,301; 6,002,247; 6,442,507 B1; 6,646,454 B2; and 6,738,454 B2.

BACKGROUND OF THE INVENTION

Modern buildings, including homes, offices, and industrial buildings, require a great deal of electrical cable to accommodate all the electrical accouterments that are now desired. Besides the standard power circuits, low voltage lighting circuits, security alarm or fire warning systems, voice communication intercom circuits, telephone circuits, and high frequency television and cable circuits, there are often requirements for cable circuits to transmit data at high speeds extending into the gigabit range.

Electrical contractors and tradesmen have often installed electrical wiring in homes or industrial buildings as a sequence of separate and distinct projects. Wiring for electric power in the building might be done first. Then the intercom and security systems are installed. Then the wiring for telephone and high speed data circuits might be another and additional project.

When high speed data circuits are required, both the installation and meeting performance goals can be a daunting task. Minimizing cost is often a high priority. And when some cables are intended to later be interconnected by patchcords or switchboards into a network system, the complexity of installation and meeting performance requirements is greatly increased.

Prior art test instruments have been available for dealing with many different aspects of cable installation in homes, office building, or industrial buildings. But the comprehensive overall management of both the technical and the business aspects of such a project has apparently not been fully addressed.

SUMMARY OF THE INVENTION

According to the present invention a comprehensive method is provided for planning, installing, and verifying a set of electrical cables in a building. A computer is used for creating a computer database model of the proposed installation. A portable test instrument is provided which has information processing capabilities that are compatible with the computer, so that it can both receive data from the computer and transfer data back into the computer. The computer and the portable test instrument are operated in a cooperative manner to effectively plan, install, test, and verify the proposed installation, and subsequently to provide reports and/or archival storage for business purposes.

By utilizing the computer, and known layout tools, a database model of the proposed installation plan is developed which includes port locations, corresponding cables to terminate at those port locations, and an indication of the specific types and desired performance characteristics for the individual cables. As part of the layout procedure, a listing of the selected cables is also automatically created by the computer and is supplemented as the plan is developed. The completed plan information is then copied or downloaded from the computer into the portable test instrument, which will be used to verify correctness of the installation and its expected performance.

For making the on-site physical installation of the cables, it is desirable to have a hard-copy printout of the plan made from the computer. Alternatively, a screen on the portable test instrument may be used to display information sufficient to guide the work of the installer. When the installation is completed, the test instrument system is utilized at the job site to test the various individual cables.

According to the presently preferred form of the invention a complete test instrument system includes both a portable test instrument and a separate remote termination unit or device which may be connected to the remote end of a cable being tested. The remote terminal is normally passive, but as part of the testing procedure it is selectively activated by a control signal sent from the portable test instrument through the cable being tested so that it becomes an intelligent device for testing signal response and/or throughput.

According to the presently preferred form of the invention the plan information as stored in the portable test instrument provides sufficient detail so that testing may be done at each separate location, which verifies the desired performance characteristics of each cable terminating at that location. Thus, the testing done at each location is restricted to the requirements applicable to that particular location. The method of the present invention particularly applies to the testing of individual cables, irrespective of whether or not they are intended to be subsequently connected as part of a network.

An important feature of the invention is that the tests made on each cable are not the comprehensive standard tests established by the industry such as the TIA568 for Ethernet cable. Instead, application-specific tests for the specific type of cable are made according to performance requirements of the plan at that location. That is, the cable performance is tested for specific things such as a certain bit rate of data flow, with an acceptable error level; and a signal-to-noise ratio within a prescribed band of frequencies corresponding to the intended use of the cable. Test results at each location are then compared against the plan requirements for that location. The result of each test is typically a pass-fail report. A summary of test result data and results of the comparisons are stored in the portable test instrument before being uploaded back to the computer.

Thereafter the completed test result data are uploaded from the portable test instrument back into the computer, and may also be accompanied by a re-copying of the plan information back into the computer.

As a further step of the process, after test results have been uploaded to the computer, the computer is utilized to print out both the plan information and the results of the comparison tests. To completely fulfill any business purpose, the computer is then used to print a final report, and/or to print an invoice to the customer, and/or to create an archive of the installation and test results for future use.

DRAWING SUMMARY

FIGS. 4A, 4B, 4C, 4D and 4E are a flow chart illustrating the sequence of steps in accordance with the presently preferred form of our new method;

FIG. 7 is a drawing of a computer screen display showing a list of the selected cables and the results prior to instrument pass/fail tests that will be made on each.

CABLE VERIFICATION

In the cable industry, and particularly when dealing with high-speed data cables, there is an industry standard process known as "Certification". This involves testing the individual cable against an industry standard, such as TIA 568. Traditional certifiers are all built to test an individual cable through a broad range of frequencies and other measurements associated with the specifications set down under TIA 568. But even the standard process of certification cannot provide a 100% certainty that the cable after being connected into a network will perform as desired. The present invention does not purport to provide a method of cable certification. On the contrary, we provide a different process which is an economically advantageous alternative, and which we designate as "Verification". In the verification process we ensure that the particular individual cable, when later connected into a network, has at least a 99% chance of working as desired in that network. We are able to do this without the necessity of testing each individual cable against a theoretical general standard. Instead, we test it for performance in the manner in which it is intended to be used in a specific installation plan. Thus, our verification process is not an abstract stand-alone process. It is done in conjunction with the cable in its position of use and for a specific intended use for the cable being tested. Thus our terminology "verification" means something that is significantly different from the industry term of "certification".

DESCRIPTION OF GENERAL FORM OF THE INVENTION

Figure 1:
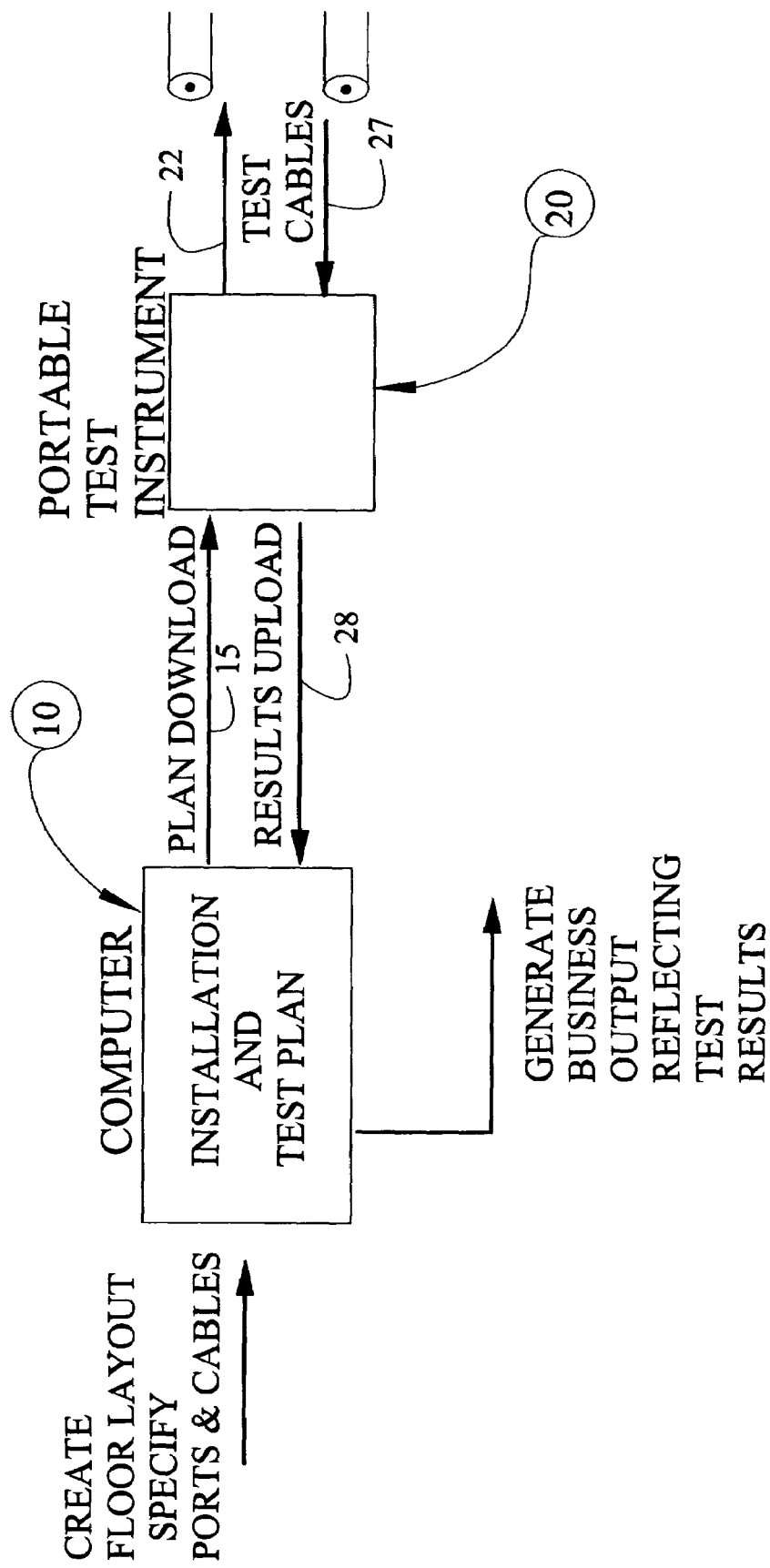
FIG. 1 is a schematic drawing, primarily in the nature of a flow chart, illustrating the cooperative operation of the computer and a portable test instrument in carrying out the method of the present invention.

Drawing FIG. 1

As illustrated in FIG. 1, a computer 10 and a portable test instrument 20 are used in a cooperative manner in order to plan, install, and verify an electrical cable system in a building. A floor plan for the building is displayed on the screen of computer 10. A listing is made of specified port locations and the corresponding cables to be terminating at those locations, and that listing is inputted into the computer 10. The derived installation plan and associated test plan will now be stored in the computer and displayed on the computer screen.

Arrow 15 indicates that the derived installation and test plan will then be downloaded, or copied or transferred, from computer 10 into portable test instrument 20. The technician will then physically carry the test instrument, with plans loaded in it, to the job site where he or she will perform actual cable installations. The test instrument preferably includes a visual display means that is available to display the identifications of individual cables as they are being installed, although a hard copy computer printout of the installation plan may also be used.

The next step as indicated by arrow 22 is to perform tests on the individual cables. The instrument 20 is moved from one port location to another. At each location the technician or operator selects a test routine to be performed at that particular location, and instructs the instrument accordingly, typically by pushing selected control buttons on the instrument.

The test instrument is provided with electronic means to visually display the test results. As each test is made, as indicated by arrow 27 the results are then stored in the test instrument. The test results for each cable are compared by the instrument against plan requirements for that cable, and the result of the comparison is stored in the instrument. A pass/fail type of comparison output is preferred.

After all the tests have been completed, the technician again places the test instrument 20 in communication with computer 10 and, as indicated by arrow 28, the comparison test results are uploaded from the test instrument back into the computer. This information transfer may also include a copy of the layout plan as originally provided to the test instrument system.

Thereafter, as a final step of the process, the computer is utilized to print out for a business purpose both the plan information and the comparison test results. The business purpose may be to print a final report, and/or print an invoice to the customer, and/or create an archive of the installation and test results for future use.

GENERAL DESCRIPTION

Figure 2:
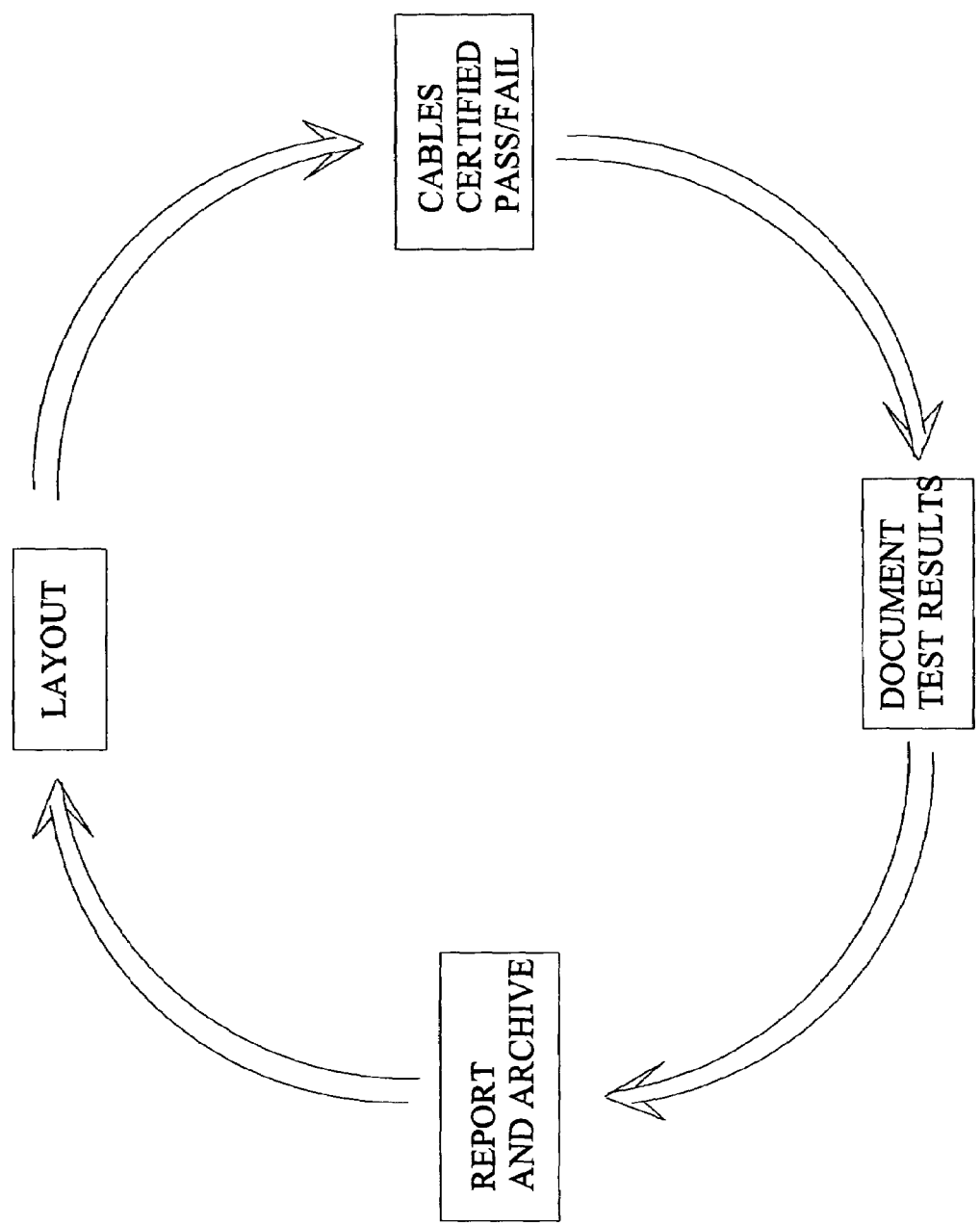
FIG. 2 is a business method flow diagram further illustrating the circular path of the information as it flows from the computer into the portable test instrument, and then, after testing of the cables and comparison of results, back into the computer.
Figure 3:
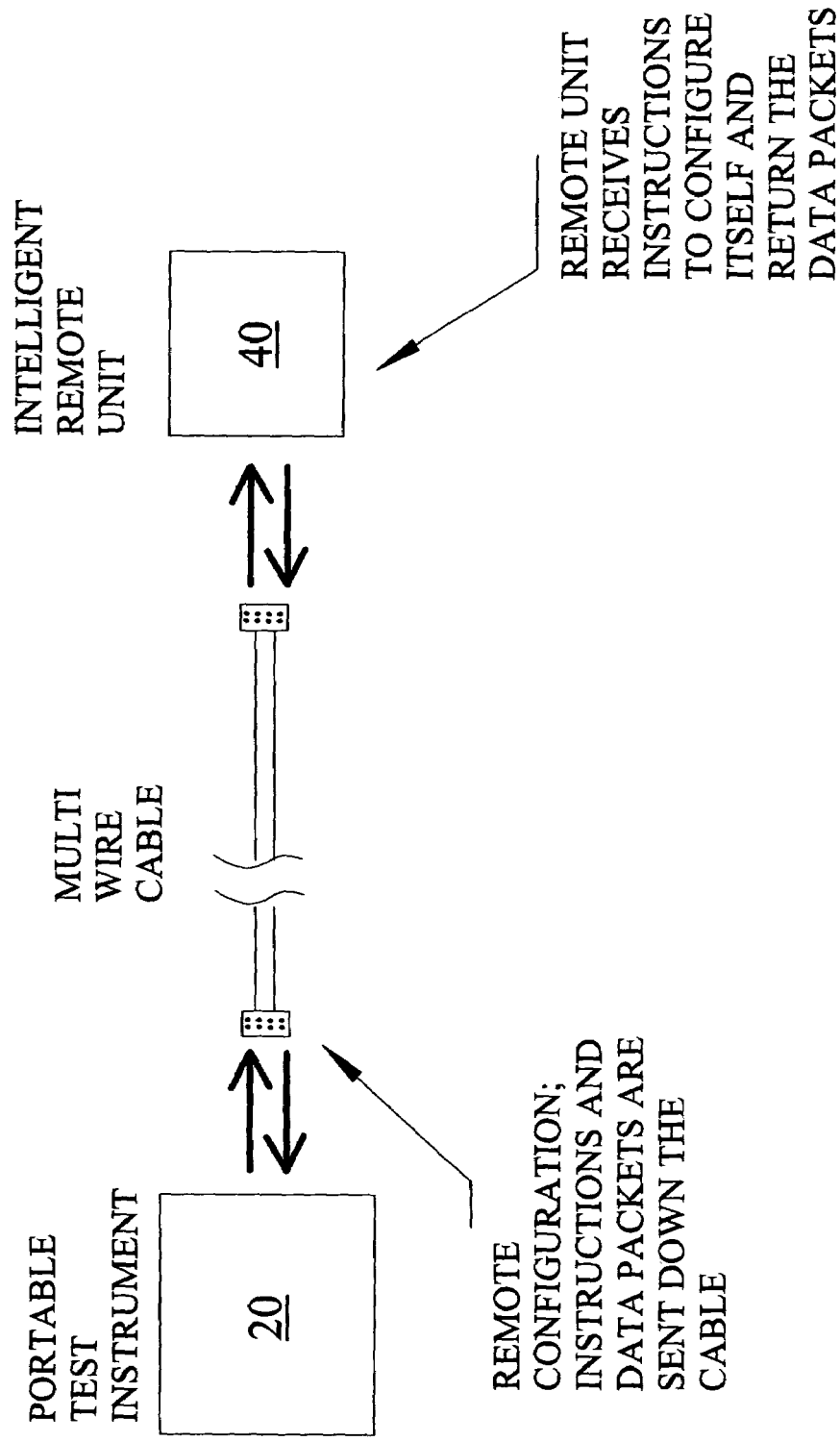
FIG. 3 is a schematic drawing, largely in the nature of a flow chart, illustrating the cooperative operation of the computer and a complete test instrument system, including both the portable test instrument and an intelligent remote unit, in carrying out the method of the present invention.

Drawing FIGS. 2 and 3

As shown in FIG. 2, the plan information flows around a circular path, going first to the portable test instrument 20, then through the testing procedure, then back to the computer 10 where it had originated but accompanied by the test result information, and then it goes to archiving and/or report printing for a business purpose.

As shown in FIG. 3, the complete test instrument system includes both the main portable test unit 20 that is connected to the input or near end of a cable, and a remote termination unit 40 connected to the remote end of a cable or line being tested. Some testing steps will require active operation of the remote unit, but some will not. Whenever the line performance is being tested for its ability to respond to or throughout any kind of signal, the remote termination unit 40 is activated by a control signal sent through the cable from the hand-held portable test instrument 20.

Many standard tests are made by the portable test instrument 20 from only the input end of the line being tested.

These may include, among others, opens, shorts, and miswires. The near end tests may also include mispairing of pairs inside a cable, as disclosed in U.S. Pat. No. 6,002,247; and measuring the length of a cable, as shown in U.S. Pat. No. 6,646,454 B2. But when the line performance is being tested for its ability to respond to or throughout any kind of signal, in accordance with the present invention the remote termination unit 40 is activated by a control signal from the portable test instrument 20.

U.S. Pat. No. 6,002,247, issued Dec. 14, 1999, is incorporated by reference the same as if fully set forth herein. That patent describes a near-end test for determining the correct pairing of wires inside a multi-wire twisted pair cable. A test signal is applied to one of the terminals assumed to represent a particular wire pair. A response is measured on the other terminal assumed to represent that wire pair, and the response is then compared to a standard to determine whether the wires inside the cable to which those two terminals are connected really are a twisted-wire pair.

U.S. Pat. No. 6,646,454, issued Nov. 11, 2003, is incorporated by reference the same as if fully set forth herein. That patent describes a near-end test of a cable to determine its length when the capacitance of the cable per unit length is already known. The input terminals for the cable are connected into an oscillator circuit and the frequency of the oscillator is then compared to a standard in order to determine the length of the cable.

One very important performance test is for the information flow rate, as for example, ten megabits per second. The remote unit when activated then sends the bit stream back to the portable test instrument 20, which has the capability to make a comparison and determine if there was an excessive error rate.

Another important test is for signal-to-noise ratio. A test of bit rate alone would not provide a margin of comfort as to the true capacity of the line. It is known, for example, that noise signals below a frequency of 10 Mhz are a major detriment to sending data at high speed over 100 Mbit Ethnet lines. Even Gigabit data systems are prone to have problems with noise signals below a 60 Mhz frequency. Noise of all types and sources is the biggest single roadblock to achieving high data transmission speeds. In our novel method we therefore test the signal-to-noise ratio of signals that are throughput to the remote unit 40 at selected frequencies within a predetermined frequency band. This apparatus arrangement is used to send analog signals in the predetermined frequency band and measure the signal-to-noise ratio to determine if it is acceptable. By giving the customer proper tests against the parameters that are set by specification IEEE 802.3, for example, we can give the customer a clearer real world indication of the capability of the cable run being tested.

DETAILED DESCRIPTION OF PREFERRED EMBODIMENT

FIGS. 4 through 8

FIGS. 4A, 4B, 4C, 4D, and 4E show the various steps of the process in detail. Most of the individual steps involve procedures that are well known in the art.

Figure 5:
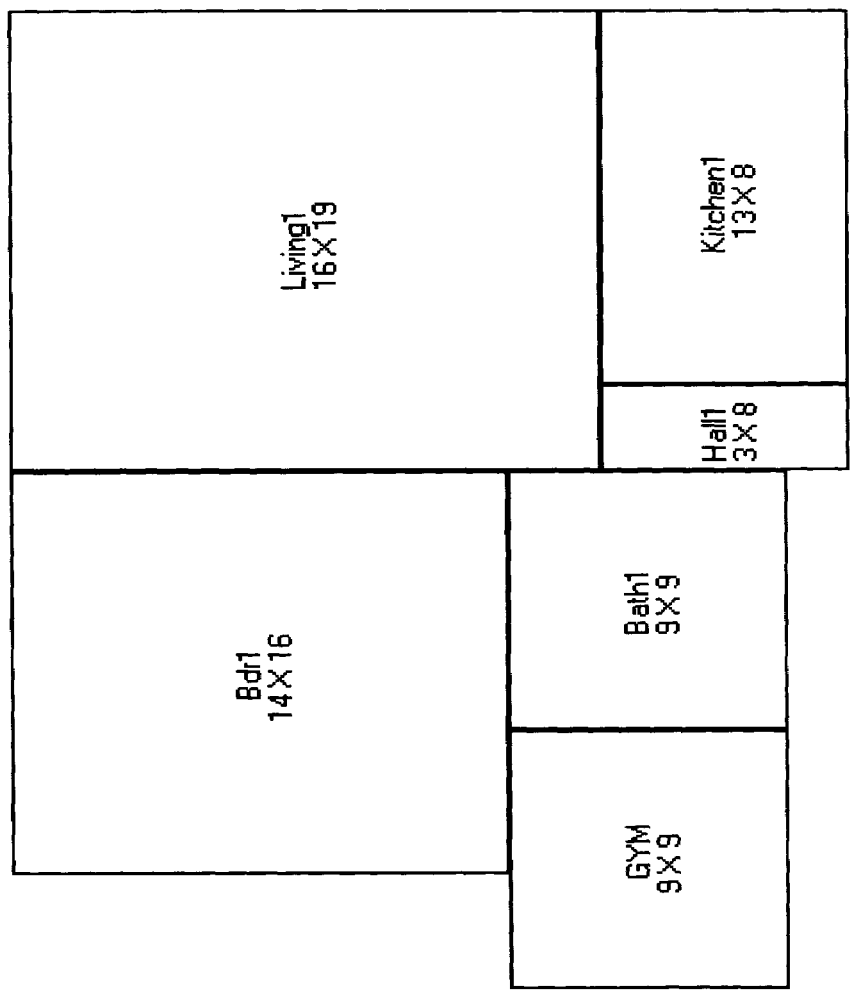
FIG. 5 is a drawing of a floor arrangement in a building in which a cable system is to be installed, as it would be displayed on the computer screen.
Figure 6:
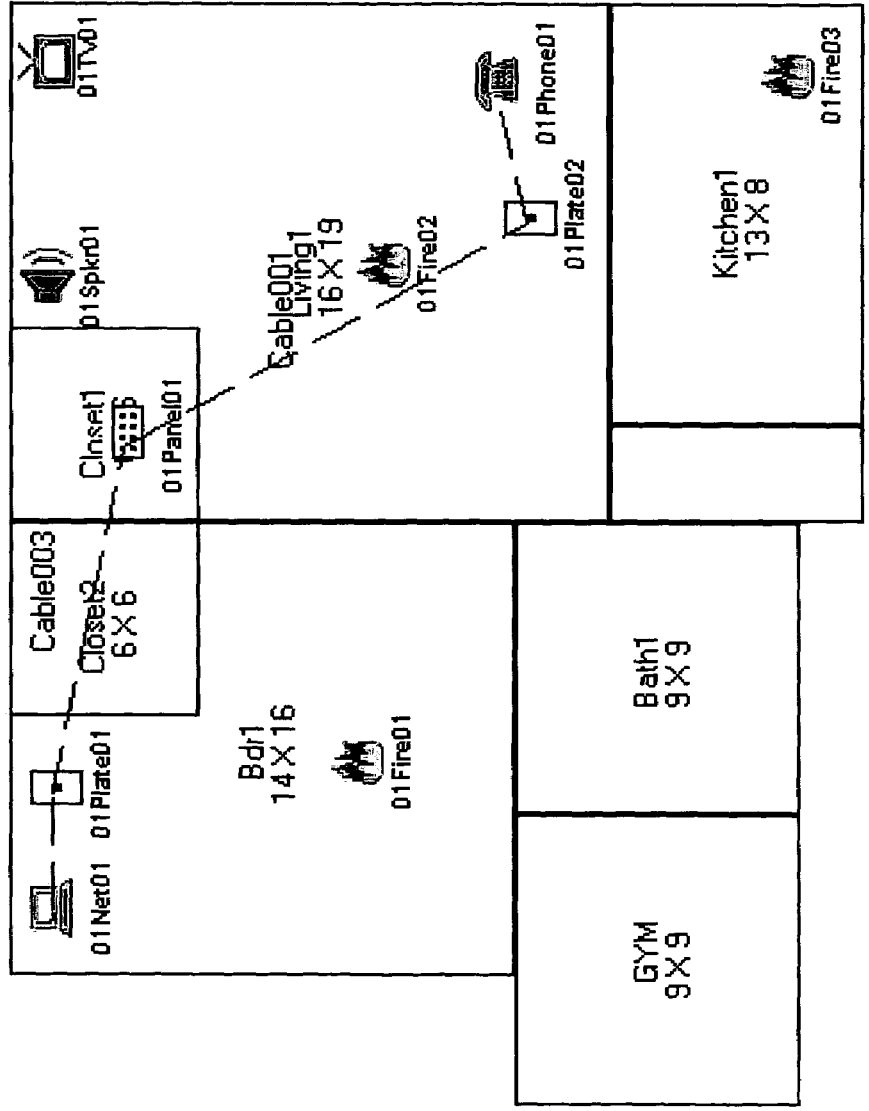
FIG. 6 shows the computer screen display of FIG. 5 after port locations for cable connections and the cable selections have been assigned.

FIGS. 5 and 6 are drawings showing computer screen displays of the floor layout and installation plan, respectively.

FIG. 7 is a drawing showing a summary report of tests on various individual cables, but prior to the actual testing which would result in some "Pass" and some "Fail" reports.

Figure 8:
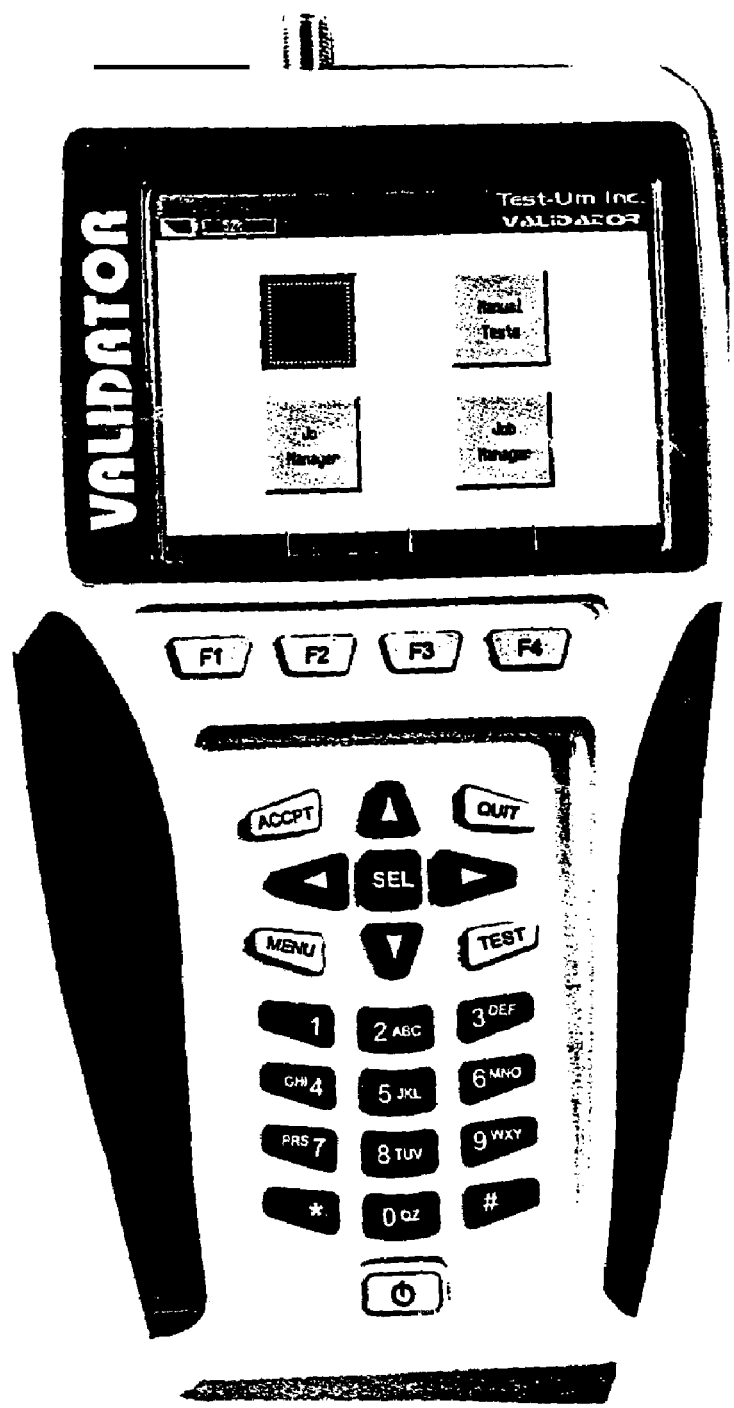
FIG. 8 is a photo of the hand-held portable test instrument.

FIG. 8 is a photo of the portable test instrument 20 as presently used to carry out the method of the invention.

Figure 4A:
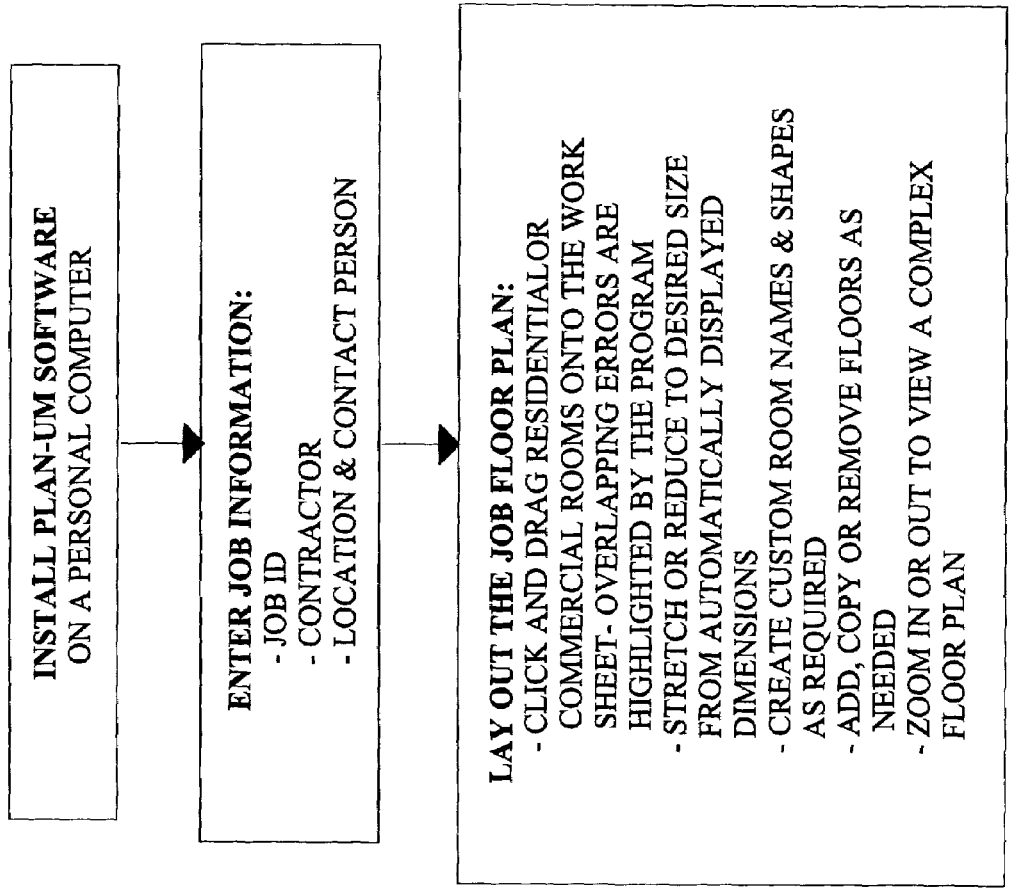
Figure 4B:
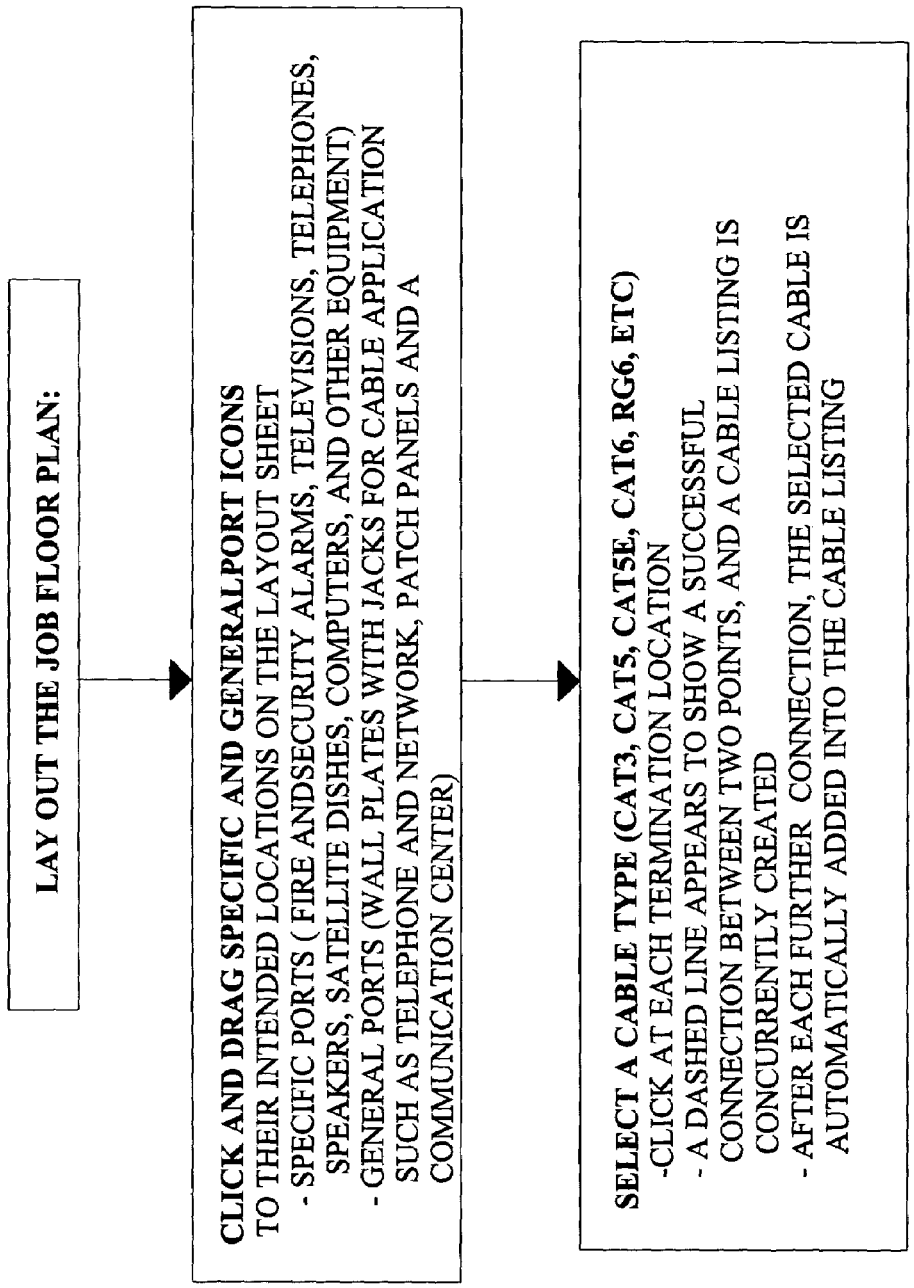
Figure 4C:
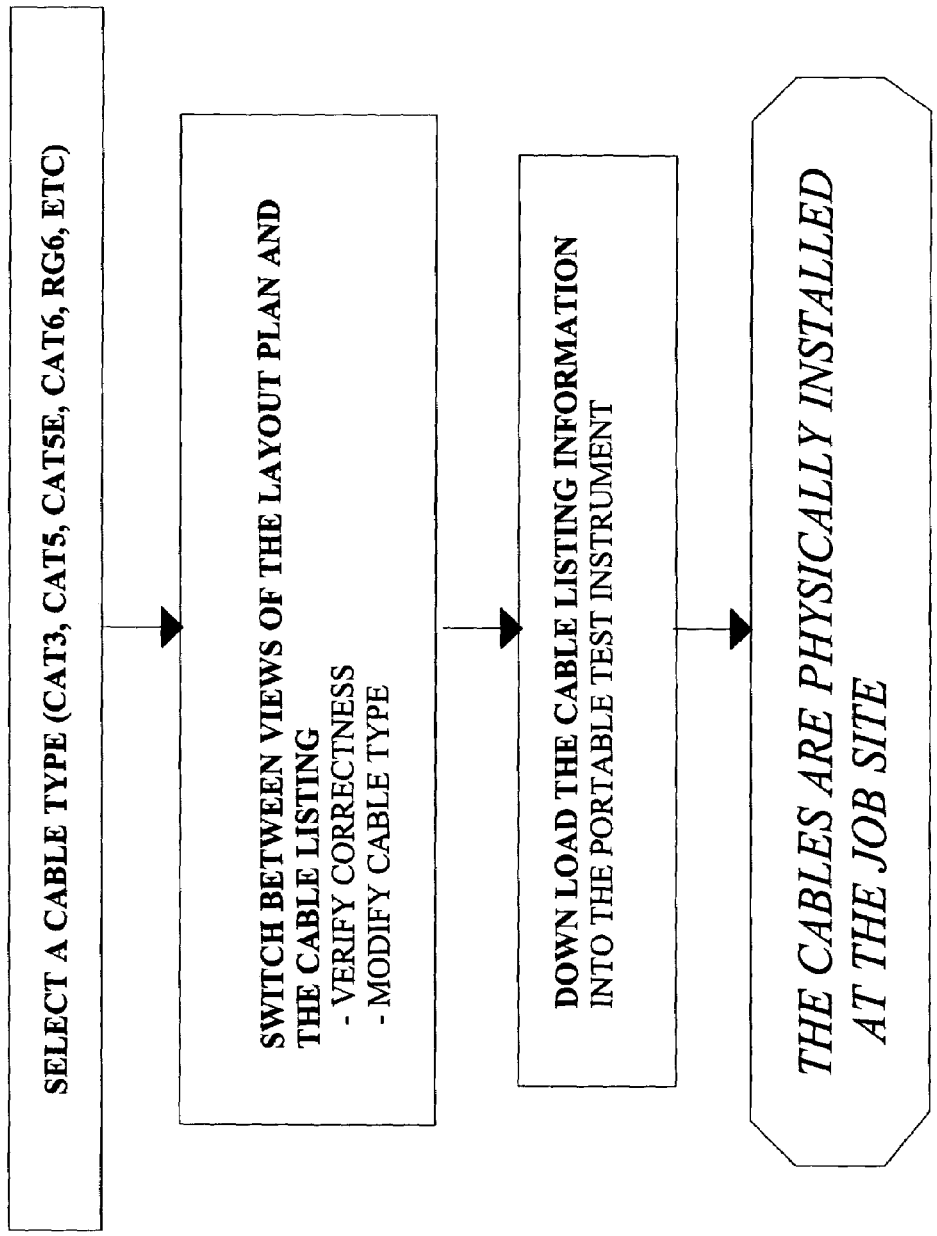
Figure 4E:
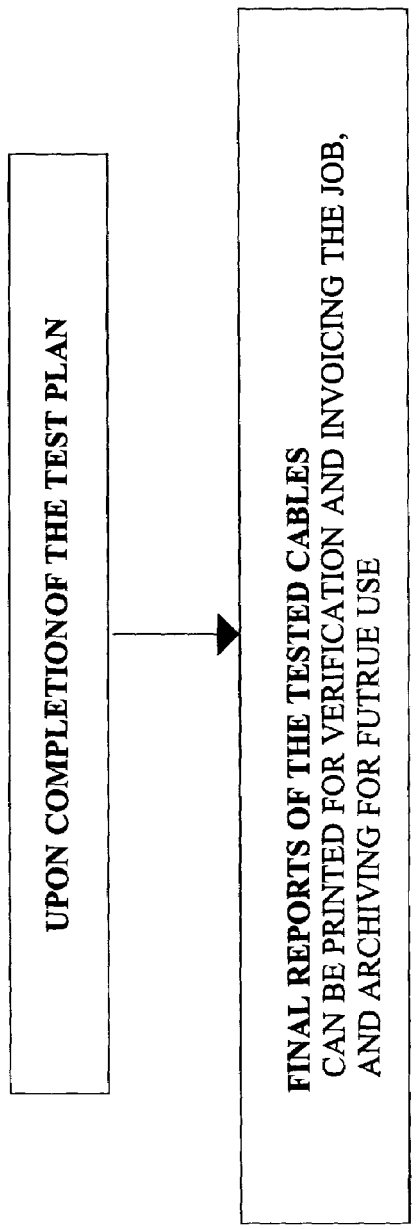

As shown in Drawing FIG. 4C, after the cable listing information is downloaded into the portable test instrument the various cables are physically installed in their assigned locations at the job site. When the test instrument is connected to a particular cable the operator then scrolls through the cable listing on the screen of the portable test instrument to display the cable number of the cable to be tested (see FIG. 4D). As shown in FIG. 7, however, the list of cables as displayed to the operator does not Indicate the test routine to be applied to each individual cable.

Tests of the performance of the installed cable are made by applying selected signals from the portable test instrument 20 through the cable to the remote test unit 40. These test signals include both bit rate data streams and analog frequency signals within predetermined frequency bands. The cable perforance is measured separately for each.

One portion of the test nade on each cable is to generate from the portable test instrument 20 a bit stream at the data flow rate desired for the cable performance. For example, the desired bit rate might be 100 Mhz. The bit stream as received by the remote terminal unit 40 is then automatically fed back to the cable input end, and circuitry within the portable unit 20 makes a comparison, and a determination as to whether the error rate is acceptable under a predetermined standard. This process of error checking is well known in computer technology.

Another portion of the test nade on each cable is to generate analog test signals at a predetermined frequency from a signal generator contained in the portable test instrument 20. The remote termination unit 40 is again kept in active operation. Portable test instrument 20 contains circuitry that determines, from the response of remote unit 40 to the transmitted signals, the level of the signal-to-noise ratio for the operation of the cable at that signal frequency. This measurement of cable operation is made by the portable test instrument 20 in conjunction with the remote termination unit 40. At least one signal frequency that is used in this test is appropriate to determine the magnitude of noise signals below a frequency of 10 Mhz, which as stated above are a major detriment to sending data at high speed over 100 Mbit Ethnet lines.

Other modifications of our method will be apparent to those persons skilled in the art. The scope of our invention is to be judged only in accordance with the appended claims.

What we claim is:

1. A method of utilizing a computer and a compatible portable test instrument system to plan, install, and verify a set of electrical cables in a building, comprising the steps of:
    (a) preparing an installation plan, comprising a floor plan with specified port locations and corresponding cables terminating at those locations, and required performance characteristics for the cables;
    (b) storing the installation plan in the computer and displaying it on the computer screen;
    (c) copying the installation plan from the computer into the portable test instrument system;
    (d) after the installation is completed, testing performance of each cable of the completed installation against its specific intended use at that location, and storing the test results in the portable test instrument system;
    (e) comparing the test results for each cable against the installation plan requirements for that cable;
    (f) storing results of the comparisons in the portable test instrument system;

(g) uploading the comparison test results from the test instrument system back into the computer; and (h) then utilizing the computer to print out for a business purpose both the installation plan and the comparison test results.

2. The method of claim 1 wherein the performance test for each individual cable includes both a data flow test at a specified bit rate and a signal-to-noise ratio test at a specified frequency.

3. The method of claim 1 wherein the performance test of each individual cable includes a test of signal-to-noise ratio at a frequency below 30 Mhz.

4. The method of claim 1 wherein each test result includes a Pass/Fail indication.

5. A comprehensive method of planning, installing, and verifying a set of electrical cables in a building, comprising the steps of: (a) creating a computer database model, comprising a graphic display of existing room layouts in the building, ports for proposed cable terminations, representations of the cable types selected to be connected to respective ports, and a representation of the plan for intended use of each cable; (b) selecting a portable test instrument system which has data processing capability compatible with the computer so that it can both receive data from the computer and transfer data back into the computer; (c) downloading the computer database model into the portable test instrument system; (d) utilizing the portable test instrument system to make tests on each cable that are application specific tests for the intended use of that particular cable, rather than industry standard tests for that cable type; and (e) then uploading test result data back into the computer for a business purpose.

6. The method of claim 5 wherein each cable is tested for bit rate flow with an acceptable error level, and also for signal to noise ratio of transfer of analog signals within a predetermined range of frequencies.

7. A method of utilizing a computer and a compatible portable test instrument system to plan, install, and verify a set of electrical cables in a building, comprising the steps of: (a) preparing a plan for the installation, and then displaying the plan on a computer; (b) copying the installation plan from the computer into the portable test instrument system; (c) after the installation is made, utilizing the installation plan as stored in the portable test instrument system to test the individual cables of the installation on the basis of their planned physical location and intended method of use, rather than the electrical specifications of the cables themselves; (d) uploading test result information from the portable test instrument system back into the computer; and (e) then utilizing the computer to print out for a business purpose the installation plan accompanied by the test result information.

8. A method of planning, installing, and verifying a data cable in a building, comprising the steps of: selecting a portable test instrument to connect to the input end of the cable; selecting a remote terminal unit to connect to the remote end of the cable; selecting a pair of ports in the building where the cable is to be terminated; establishing the data flow capacity desired for the cable on the basis of its planned physical location and intended method of use, rather than the electrical specifications of the cable itself; installing the cable between the ports; and then testing the cable performance by applying signals from the portable test instrument through the cable to the remote terminal unit.

9. A method of planning, installing, and verifying a data cable in a building, comprising the steps of: selecting a portable test instrument to connect to the input end of the cable; selecting a remote terminal unit to connect to the remote end of the cable; selecting a pair of ports in the building where the cable is to be terminated; establishing the data flow capacity desired for the cable to have in its intended method of use; installing the cable between the ports; and then testing the cable performance by applying signals from the portable test instrument through the cable to the remote terminal unit, wherein the test signals are a bit stream at the data flow rate desired for the cable performance, the bit stream received by the remote terminal unit is fed back to the cable input end, and a measurement of error rate is made by the portable test instrument.

10. A method of planning, installing, and verifying a data cable in a building, comprising the steps of: selecting a portable test instrument to connect to the input end of the cable; selecting a remote terminal unit to connect to the remote end of the cable; selecting a pair of ports in the building where the cable is to be terminated; establishing the data flow capacity desired for the cable to have in its intended method of use; installing the cable between the ports; and then testing the cable performance by applying signals from the portable test instrument through the cable to the remote terminal unit, wherein the test signals are analog signals at a predetermined frequency, and the signal-to-noise ratio of cable operation at that frequency is measured by the portable test instrument in conjunction with the remote terminal unit.

11. A method of planning, installing, and verifying a data cable in a building, comprising the steps of: selecting a portable test instrument to connect to the input end of the cable; selecting a remote terminal unit to connect to the remote end of the cable; selecting a pair of ports in the building where the cable is to be terminated; establishing the data flow capacity desired for the cable to have in its intended method of use; installing the cable between the ports; and then testing the cable performance by applying signals from the portable test instrument through the cable to the remote terminal unit, wherein a bit stream and an analog signal are applied separately to the input end of the cable, and the cable performance is measured separately for each.

12. A method of planning, installing, and verifying the performance of an electrical cable in a building, comprising the steps of:

(a) creating a computer data base with a graphic display of a room layout in the building, ports for the proposed termination of the cable, a selected cable type to be connected to the respective ports, and a corresponding test routine to be performed on that cable at a particular port;

(b) selecting a portable test instrument system which has data processing capability compatible with the computer so that it can receive data from the computer;

(c) downloading into the portable test instrument system the computer data representing both a particular port to which the selected cable type is to be connected and the corresponding test routine to be performed at that particular port;

(d) after the cable has been installed, connecting the portable test instrument system to at least the near end of the cable at that port; and (e) then actuating the portable test instrument system by pushing a selected control button to perform the corresponding test routine for that cable at that particular port location and produce a report of the test results.

13. A method as in claim 12 wherein a test routine performed on a cable at a particular port is not the industry standard test for that cable type.

14. A method as in claim 12 wherein the individual cable is not tested against a theoretical general standard.

15. A method of testing cables installed in a structure, comprising the steps of: (a) storing information identifying a list of cables and their intended locations in a portable test instrument, and displaying the list on the portable test instrument; (b) connecting the portable test instrument to a particular cable; (c) selecting the corresponding cable from the visibly displayed list; and (d) activating the portable test instrument by pushing a button to apply a test routine to that cable.

16. A method as in claim 15 wherein the test routine applied to the cable was defined upon the basis of the planned physical location and the intended use of the cable, rather than upon the electrical specifications of the cable itself, and includes a near-end test for length of the cable by measuring its input capacitance.

17. A method as in claim 16 wherein the individual cable is not tested against a theoretical general standard.

18. A method as in claim 16 wherein a test routine for the cable is selected by scrolling through the visibly displayed list of cables and selecting a cable number identified on that list.

19. A method as in claim 15 wherein a test routine performed on a cable at a particular port is not the industry standard test for that cable type, and includes testing signal response of a pair of terminals of a multi-wire twisted pair cable to determine whether those terminals are indeed connected to a pair of wires that are twisted together inside the cable.

20. A method of installing an electrical cable in a structure and testing its electrical performance, comprising the steps of: (a) planning a test routine for the cable upon the basis of the cable location and its intended use; (b) downloading the test routine into a portable test instrument; (c) after the cable is installed, connecting the portable test instrument to the cable; and (d) applying that test routine to the cable to measure its performance.

21. The method of claim 20 wherein the test routine is selected from a visibly displayed list of cables by an operator pushing a button on the portable test instrument.

22. The method of claim 20 wherein the portable test instrument is selected to store test routines for a plurality of different cables, and is moved from one location to another after each test is made.

23. A method as in claim 22 wherein a plan for the installation for a plurality of cables is created in a computer database and the database is then transferred into the portable test instrument.

24. A method as in claim 22 wherein the portable test instrument is selected to provide a visual display of information regarding a plurality of cables, and an operator scrolls through the visual display to select a particular cable to be tested.

25. The method of claim 20, wherein the test routine applied to the cable is application-specific, rather than the industry standard test for that cable type.

26. A method of using a computer to create a computer database model of a proposed installation of a set of electrical cables in a building, including a floor plan, cable port locations on that floor plan, corresponding cables which are to terminate at respective port locations, and a listing of the specific type and desired performance characteristics for each of the individual cables, comprising the steps of:
(a) transferring the computer database model into a portable test instrument;
(b) installing the cables such that they terminate at respective port locations in accordance with the computer database model;
(c) moving the portable test instrument from one port location to another; and
(d) at each port location, using the portable test instrument to make application-specific tests for the specific type of cable or cables terminating at that location in accordance with the performance requirements of the computer database model at that location.

27. The method of claim 26 wherein the computer database model as transferred into the portable test instrument provides sufficient detail so that testing may be done at each separate port location, to verify the performance characteristics of each cable terminating at that port location.

28. The method of claim 26 wherein the portable test instrument is also used to compare the cable performance at each location with the requirements of the computer database model for that location, and to generate a pass-fail report.

29. The method of claim 26 wherein, after the portable test instrument has been used to test the installed cables, test result information is then transferred from the portable test instrument back into the computer.

30. The method of claim 26 wherein cable performance is tested for a certain bit rate of data flow with an acceptable error level, and a signal-to-noise ratio within a prescribed band of frequencies corresponding to the intended use of the cable.

31. The method of claim 30 wherein the test result is compared against the requirements of the computer database model for that location, and a pass-fail report is prepared.

32. The method of claim 26 wherein test information is obtained in part from a separate remote terminal unit that is connected to the remote end of a cable being tested, by sending a control signal from the portable test instrument through the cable being tested to the remote terminal unit to provide a response for testing signal throughput.

33. The method of claim 26 wherein as the computer database model is developed a listing of the selected cables is automatically created and progressively supplemented by the computer.

34. A method of using a computer to create a computer database model of a proposed installation of a set of electrical cables in a building, including a floor plan, cable port locations, corresponding cables which are to terminate at the respective port locations, and a listing of specific types and desired performance characteristics for the individual cables, comprising the steps of:
(a) creating a listing of the selected cables that is automatically supplemented by the computer as the computer database model is developed;
(b) transferring the completed computer database model to a portable test instrument;
(c) using the portable test instrument to test the installed cables; and
(d) transferring test result information from the portable test instrument back into the computer.

35. The method of claim 34 wherein the computer database model as transferred into the portable test instrument provides sufficient detail so that testing may be done at each separate port location, to verify the performance characteristics of each cable terminating at that port location.

36. The method of claim 35 wherein at each port location application-specific tests are made for the specific type of cable according to performance requirements of the computer database model at that location.

37. The method of claim 36 wherein cable performance is tested for a certain bit rate of data flow with an acceptable error level and a signal-to-noise ratio within a prescribed band of frequencies corresponding to the intended use of the cable; the result is compared against the requirements of the computer database model for that location; and a pass-fail report is prepared.

38. The method of claim 34 wherein test information is obtained in part from a separate remote terminal unit that is connected to the remote end of a cable being tested, and a control signal is sent from the portable test instrument through the cable being tested to the remote terminal unit to provide a response for testing signal throughput.

39. The method of claim 34 wherein, after test results have been uploaded to the computer, the computer is utilized to print out both the information of the computer database model and the results of the comparison tests.

* * * * *